No. 715,449. Patented Dec. 9, 1902.
F. R. WILLSON, Jr.
CONVEYER.
(Application filed May 18, 1900.)
(No Model.)
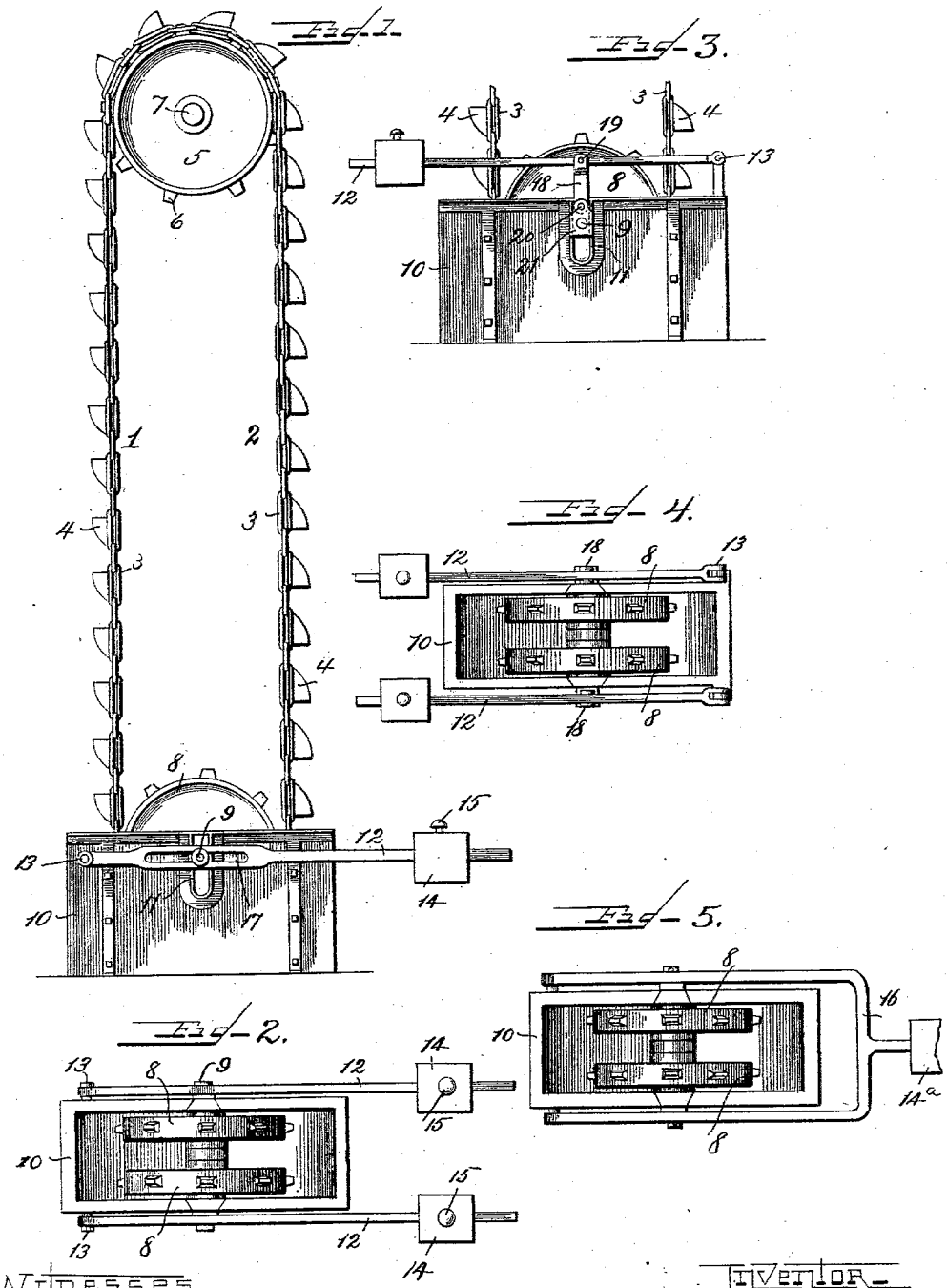
Witnesses
JB Weir
Ira L. Perry
Inventor
Freeman R. Willson, Jr.
by H. H. Bliss,
attorney.
THE NORRIS PETERS CO., PHOTO-LITHO., WASHINGTON, D. C.

UNITED STATES PATENT OFFICE.

FREEMAN R. WILLSON, JR., OF COLUMBUS, OHIO, ASSIGNOR TO JOSEPH A. JEFFREY, OF COLUMBUS, OHIO.

CONVEYER.

SPECIFICATION forming part of Letters Patent No. 715,449, dated December 9, 1902.

Application filed May 18, 1900. Serial No. 17,108. (No model.)

*To all whom it may concern:*

Be it known that I, FREEMAN R. WILLSON, Jr., a citizen of the United States, residing at Columbus, in the county of Franklin and State of Ohio, have invented certain new and useful Improvements in Conveyers, of which the following is a specification, reference being had therein to the accompanying drawings.

My invention relates more especially to an improved tension and traction increasing device for elevators or conveyers, the object being to provide a simple and readily-adjustable means for applying stress to both the loaded and unloaded legs of the apparatus, so as to maintain the legs with their buckets or equivalent material-holding appliances in proper alinement and give the necessary traction between the strand or strands and the power wheel or wheels. Where two strands or chains are employed for carrying the bucket, it is further desirable to independently regulate the strain on each strand, and do this yieldingly in order that undue friction may be avoided and each strand left free within limits to individually accommodate itself to the requirements of the work being performed. My invention attains these ends and furnishes a smoothly-running elevating or conveying apparatus with a minimum waste of power in its operation. Where the means for holding one end of the elevating or conveying devices, such as a wheel or pulley, is above the holding means at the other end, it is ordinarily necessary to drive the apparatus by power applied to the wheel at the upper end, but under some circumstances it is necessary or desirable to drive from the lower end, and by the use of my invention and the application of tension in addition to that produced by the load to the legs of the apparatus, so as to produce sufficient traction between the strand or chain and the wheel at the lower end, the elevator or conveyer may be driven from such wheel.

In order to make the invention more clearly understood, I have shown in the accompanying drawings means for carrying the same into effect without limiting my improvements in their useful applications to the particular constructions, which for the sake of illustration I have delineated.

In said drawings, Figure 1 is a side view of an elevating or conveying apparatus embodying my invention. Fig. 2 is a plan view of the lower portion of the same, the chains and buckets being removed. Fig. 3 is a side view of the lower portion of another form of the apparatus also embodying the invention. Fig. 4 is a plan view of the parts shown in Fig. 3, the chains and buckets being removed. Fig. 5 is a plan view of the lower portion of another form of the apparatus, also embodying the invention.

Referring to the drawings, 1 indicates the ascending or advancing and 2 the returning leg of the elevating or conveying apparatus, each consisting of one or more strands or chains 3, to which are attached the material-holding means or buckets 4. The holding means for the upper end of said chain consists of one or more wheels or pulleys 5, preferably having sprocket-teeth 6 for engaging the chain and mounted on a shaft 7. At the lower end of the apparatus the chains pass around a similar sprocket wheel or wheels 8, carried by a shaft 9. The wheels 8 are contained within a loading chamber, hopper, or boot 10, relative to which the shaft 9 is movable in the direction of the length of the elevator in guides 11.

The tension device comprises levers 12 12, fulcrumed at 13 upon any suitable fixed support, such as the part 10, suitably connected with the shaft 9, so as to allow of the necessary relative horizontal movement and carrying at their free ends weights 14. The latter are adjustable on the levers to regulate the amount of tension to be applied to the shaft 9 and legs 1 and 2 and may be secured when adjusted by pins or screws 15. I may under certain conditions connect the free ends of the levers by a cross-bar 16 and employ a single weight 14ª, as shown in Fig. 5.

Various means may be employed for connecting the tension device with the shaft 9 in such manner as to allow of the necessary relative horizontal movement which occurs in the up-and-down movement of the levers. In the construction illustrated in Fig. 1 this is accomplished by providing the levers with longitudinal bearings or slots 17, which engage the ends of the shaft 9. In the construction shown in Figs. 3 and 4 the levers do not engage directly with the shaft 9, but are connected by means of links 18, pivoted at 19 to the levers and at 20 to the sliding bearings 21 of said shaft, these bearings being mounted and movable in the guides 11. Either the slot connection or the link connection above described may, however, be applied at the fulcra of the levers, so as to allow the levers to be pivotally connected directly with the ends of the shaft 9.

It will be observed that when the parts are arranged as described—that is to say, when the movable shaft of the adjustable pulley or wheel is mounted between straight guides, such as 11, in the side walls of the boot or loading chamber and the tension means are so connected with the said shaft as to permit a longitudinal movement of the shaft relative to the tension devices as the shaft moves in its guides—I am enabled to insure not only a uniform tension upon the conveyer chain, rope, or belt, but I am also enabled to maintain the position of the conveyer relative to the end walls of the boot fixed, whatever be the adjustment of the conveying apparatus—that is to say, the lengthening or shortening of the conveyer as a whole does not change the path followed by the conveyer-buckets, so far as the relation of that path to the end walls of the boot or loading-chamber is concerned.

While attaining all the necessary and desirable ends of a tension and traction increasing device for elevators, my invention dispenses with springs, which are objectionable on account of their limited action and efficiency and expense attendant upon their manufacture, mounting, adjustment, and liability to breakage.

Referring to Figs. 1 to 4 it will be observed that the levers 12 12 are independent of each other, so that by a proper relative adjustment of their weights 14 different amounts of tension may be placed upon the two parallel strands or chains, of which each leg of the conveyer is preferably composed, according to the respective requirements of each side of the apparatus.

The invention is especially useful where the conveying devices are used for the transportation of hot materials and mixtures. In such uses the strands or chains are subject to considerable expansion and contraction, so that a properly-running conveyer cannot be maintained without provision for the automatic changing of the distance between the upper and lower shafts and chain-engaging wheels or pulleys. The present invention fulfils these requirements and automatically takes up the slack of either chain, the one independently of the other, in case such chain becomes heated and lengthened by immersion in or contact with a hot material or mixture which is being transported. On the other hand, as such chain or chains may cool and contract the lower chain-engaging wheel is permitted to correspondingly move upward, and it is to be observed that during such lengthening and shortening of the chains the tension on the chains is constant and not increased with the contraction and decreased with the expansion, as where springs are employed for applying tension to the strands of a conveyer, or to allow the yielding of the chain-engaging parts.

What I claim is—

1. In a conveying apparatus, the combination of an endless chain, buckets carried thereby, a wheel around which the chain passes, another wheel and its supporting-shaft about which the chain passes, a loading-chamber inclosing the latter wheel, straight guides in which is mounted the shaft of the last-said wheel, arranged to permit movement of the shaft and its wheel without varying the path followed by the buckets relative to the end walls of the loading-chamber, and a weighted lever connected with the said shaft and arranged to apply tension to the conveyer-chain, substantially as set forth.

2. In an elevating or conveying apparatus, the combination of a chain, material-holding means carried thereby, a wheel for supporting the upper end of the chain, a wheel at the lower end or turn of said chain, a weighted lever and connections between said lever and the lower wheel comprising means for allowing a longitudinal movement relative to the said lever, substantially as and for the purposes set forth.

3. In an elevating or conveying apparatus, the combination of a chain, material-holding means carried thereby, a wheel for supporting the upper turn of the chain, a wheel at the lower turn of said chain, a loading chamber or boot inclosing the latter wheel, a weighted lever fulcrumed on said boot and connections between said lever and the lower wheel comprising means for allowing a longitudinal movement relative to the said lever, substantially as and for the purposes set forth.

4. In an elevating or conveying apparatus, the combination of two parallel chains, buckets carried thereby, wheels engaging said chains at their upper turns, wheels engaging the lower turns of said chains, independent weighted levers, and connections between said levers respectively and said lower wheels comprising means for allowing a longitudinal movement relative to the said lever, substantially as and for the purposes set forth.

5. In a conveying apparatus, the combination of an endless chain, buckets carried thereby, a stationary upper wheel 5, with which the chain engages, a movable lower wheel 8, with which the chain also engages, the shaft of the last-said wheel, a loading-chamber in which the wheel 8 is situated, straight guides 11 carried by the side walls of the said loading-chamber in which the shaft of the lower wheel is mounted, and a weighted lever 12, provided with a slot 17 in which is mounted the shaft of the adjustable wheel 8, substantially as set forth.

6. In an elevating or conveying apparatus, the combination of an endless conveyer, buckets thereon, supporting means for said conveyer, a loading-boot containing the lower end of the conveyer, and yielding tension means acting downward and independently on the two sides of the conveyer.

7. In an elevating or conveying apparatus, the combination of an endless conveyer, buckets thereon, supporting means for said conveyer, a loading-boot containing the lower end of the conveyer and having guides for the same, and separate yielding tension means for drawing downward independently the two sides of the conveyer.

In testimony whereof I affix my signature in presence of two witnesses.

FREEMAN R. WILLSON, JR.

Witnesses:
   J. C. BRIGGS,
   F. E. COTTON.